United States Patent [19]

Henriksen

[11] Patent Number: 4,765,807
[45] Date of Patent: Aug. 23, 1988

[54] METHOD AND APPARATUS FOR THE OXYGEN ENRICHMENT OF WATER

[75] Inventor: Norolf Henriksen, Notodden, Norway

[73] Assignee: Norsk Hydro a.s., Oslo, Norway

[21] Appl. No.: 939,441

[22] Filed: Dec. 4, 1986

[30] Foreign Application Priority Data

Feb. 11, 1986 [NO] Norway .................................. 860474

[51] Int. Cl.⁴ ............................................. B01D 19/00
[52] U.S. Cl. ........................................ 55/51; 55/68; 55/158; 55/204; 55/257 C; 55/257.4; 210/188; 119/3
[58] Field of Search ...................... 55/36–40, 55/46, 51, 53, 55, 68, 204, 257 C; 210/188; 119/3

[56] References Cited

U.S. PATENT DOCUMENTS

| | | | |
|---|---|---|---|
| 4,116,164 | 9/1978 | Shabi et al. | 119/3 |
| 4,428,757 | 1/1984 | Hall | 210/188 |
| 4,643,743 | 2/1987 | Grader | 55/68 |

FOREIGN PATENT DOCUMENTS 1531537  11/1978  United Kingdom .................... 55/53
1183209  12/1982  U.S.S.R. ................................ 119/3

Primary Examiner—Bernard Nozick
Attorney, Agent, or Firm—Wenderoth, Lind & Ponack

[57] ABSTRACT

A system for the treatment of liquids, especially oxygen enrichment of water which is used for aquaculture purposes such as the breeding of fish, avoids gas bubbles in a water reservoir and makes it possible to freely treat fresh water and/or recirculated water for optimal temperature control and/or water removal. A water flow is joined with a flow of pure oxygen gas which is supplied from an oxygen tank containing liquid oxygen. The oxygen is led through an evaporator into a flow system forming a recirculating circuit with pipelines, and an oxygen enrichment device or reactor unit where water and oxygen are mixed to form a turbulent, foaming gas/liquid flow mixture. Such mixture is subsequently led into a gas/liquid separator where gas and liquid are separated. The gas mixture from the separator, which now in addition to oxygen also will contain contaminants such as nitrogen and carbon dioxide, is recirculated by means of a compressor. To prevent the build-up of great amounts of nitrogen and other contaminants, there is provided a deaeration device in the form of a bleed or in the form of a special separation unit.

14 Claims, 4 Drawing Sheets

METHOD AND APPARATUS FOR THE OXYGEN ENRICHMENT OF WATER

BACKGROUND OF THE INVENTION

This invention relates to the treatment of liquids, especially oxygen enrichment of water which is utilized for aquaculture purposes such as fish breeding.

In aqueous environments for this purpose it is important to have available clean water, rich in oxygen and of high quality. According to the prior art it has been conventional to bubble air through the water to keep the oxygen content within a range of from 80–100% of saturation. It has, however, recently been proved that it is advantageous to increase the oxygen content to a super saturation of from 120–250%. This increases the growth rate substantially and also makes it possible to obtain a higher degree of utilization of a given breeding volume. Instead of using air or an oxygen containing gas for enrichment of water, it is also conventional to use pure oxygen as this results in less contamination and greater effect.

It is also important that there be no super saturation of nitrogen in the water. Already, at 3–6% of super saturation, there is a risk that the fish will suffocate. This can be critical, especially if heated water is utilized for fish breeding, as the amount of gas saturation in water will decrease with increasing temperature of the water.

Correspondingly, it is of equal importance to provide a low content of nitrogen and eventually to reduce such content through treatment of the water, as it is to have a sufficiently high content of oxygen.

From U.S. Pat. No. 4,116,164 is known a method for enrichment of the oxygen content in water in a fish breeding reservoir where an oxygen-containing gas, containing at least 25 percent by volume of oxygen, is introduced into the water reservoir and where the gas is bubbled through and distributed into the water to maintain a total dissolved oxygen level of at least 120% of super saturation in relation to ambient pressure and temperature. This requires the use of excess of an gas. That amount of gas which is not dispersed and dissolved into the water will rise to the surface where it is collected by means of a gas hood or the like. After purification and addition of fresh oxygen, the gas is returned to the water reservoir.

Such a method has, however, a number of drawbacks. The rising gas bubbles will create a form of ejector action and this will cause contamination due to uprising of excrements from the bottom. The lower specific weight of the water in the area where the gas bubbles are rising results in a decreased volume for utilization for breeding, because fish and fish fry will avoid the area where the bubbles are rising. The amount of water available is often a critical factor, especially when there are restricted amounts of water for utilization.

SUMMARY OF THE INVENTION

The present invention relates to an improved method and apparatus for water treatment and oxygen enrichment without these drawbacks. Thus, it is the object of the invention to provide a method and apparatus where gas bubbles in the water reservoir are avoided and where there is freedom to treat fresh water and/or recirculated water for optimal temperature control and/or water renewal.

Further it is an object of the invention to provide a method and apparatus allowing a great degree of super saturation of the treated water, at the same time as the amount of nitrogen and other pollutions of the water are kept at a low level.

The ability of the water to absorb gas will increase proportionally with an increase of the water pressure. The invention allows for oxygen addition with a water pressure of several atmospheres, such that one has nearly complete freedom to choose the amount of oxygen super saturation of the circulating water up to several hundred percent.

BRIEF DESCRIPTION OF THE DRAWINGS

These and other objects of the invention are obtained with the method and apparatus which are described in the detailed description and the examples below, with reference to the accompanying drawings, where.

DETAILED DESCRIPTION OF THE INVENTION

Figure 1:
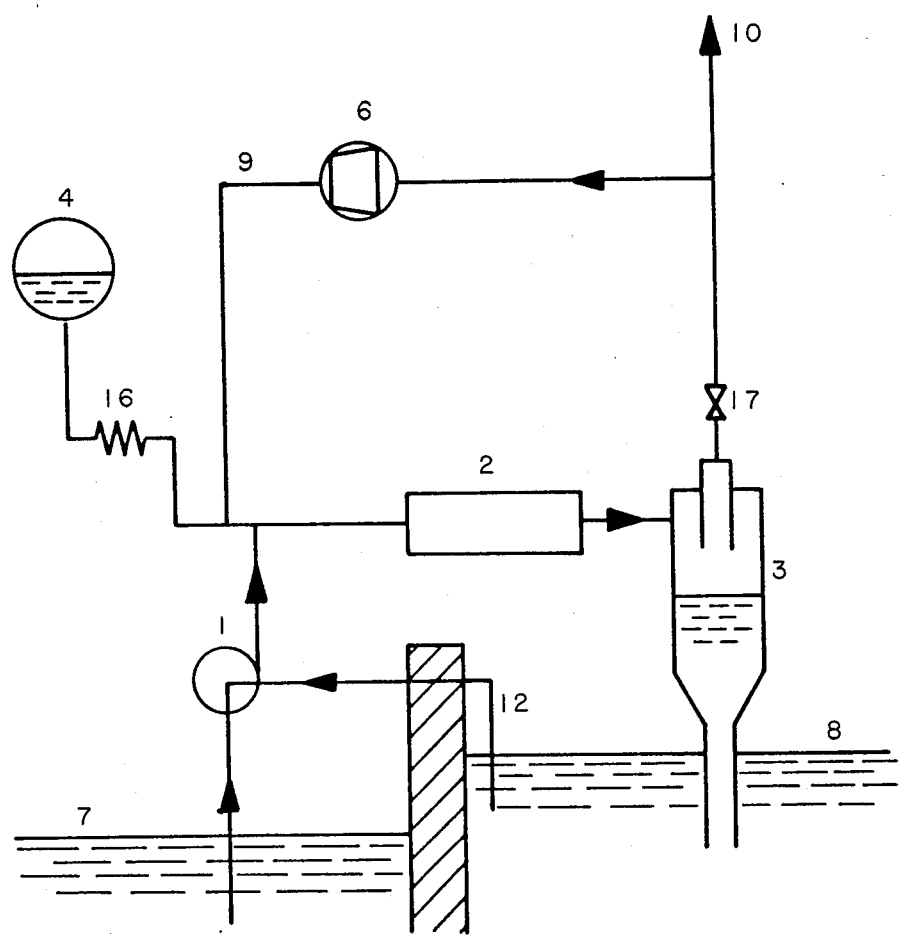
FIG. 1 is a schematic view or flow sheet of a treating unit intended for a large breeding pond.

In FIG. 1 is shown a pump 1 taking water from a fresh water source 7 and/or from a breeding pond 8.

The stream of water is joined with a stream of pure oxygen which is introduced from an oxygen tank 4 containing liquid oxygen. The liquid oxygen is passed through an evaporator 16 into a flow system forming a recirculation circuit including pipelines 9, an oxygen enrichment means 2, where water and oxygen are mixed together to form a turbulent, foaming gas/liquid flow, and a gas/liquid separator 3, where gas and liquid are separated. The gas mixture from the separator 3 which now in addition to oxygen also may contain contaminants such as nitrogen and carbon dioxide, is recirculated by means of a compressor 6. To prevent the building up of greater amounts of nitrogen gas and other contaminants, there is provided an outlet 10, below called a bleed 10, where a proportion of the contaminated gas mixture is blown off under controlled conditions.

Figure 2:
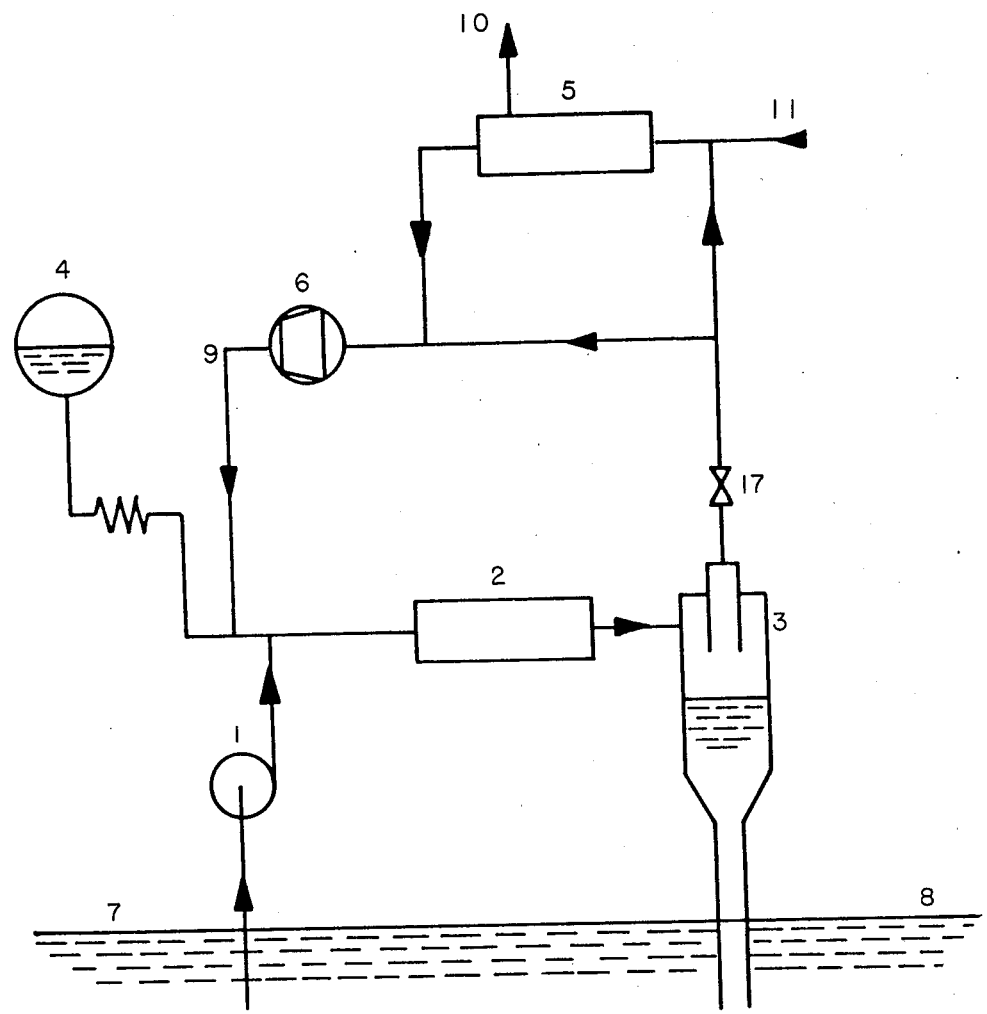
FIG. 2 is a similar view but with a purification unit added.

FIG. 2 shows a water treatment unit corresponding to FIG. 1, but with portion recovery of oxygen from the bleed gas by means of a membrane separator or a so-called pressure swing separator (PSA) 5 where an absorbing agent is utilized to separate oxygen. In this way a greater part of that oxygen which is added from the oxygen tank 4 is utilized.

If so wanted, the oxygen can also be prepared from air which is led to a pressure swing separator, which then would replace the oxygen source 4. A pipeline 11 can then be used as an air inlet. This means that a substantially greater and more expensive PSA separator has to be used. Which one of these solutions should be selected is, however, primarily a question of costs. Furthermore, to obtain a higher possible super saturation of the water, the gas addition can be performed at elevated pressure. A valve 17 is provided to establish such higher pressure. The stream of water can conveniently be recirculated through the treatment unit. This is done by means of a pipeline connection 12, shown in FIG. 1.

Figure 3:
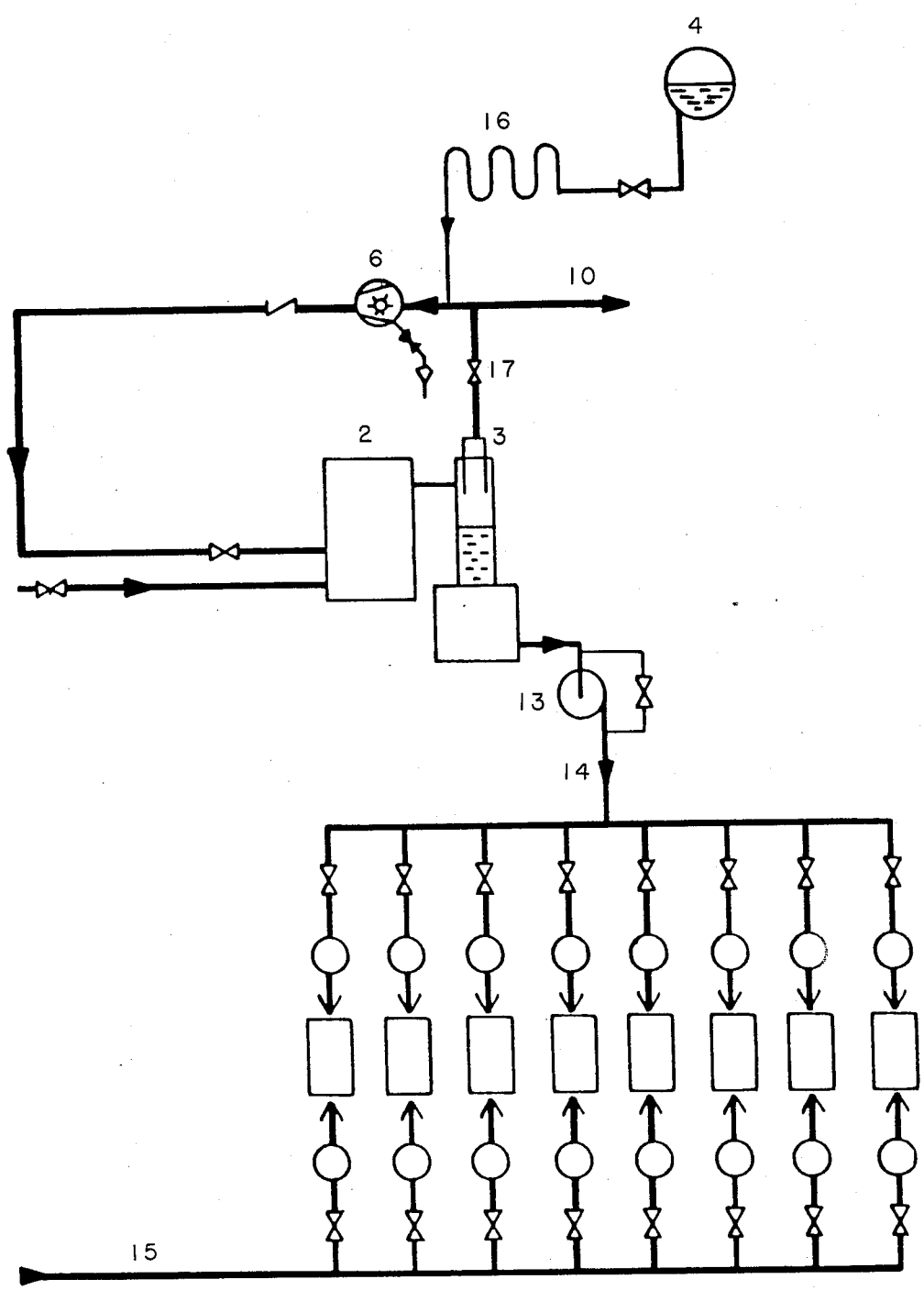
FIG. 3 is a schematic view of a central treating unit intended for supply of oxygen-enriched water to a plurality of smaller breeding containers or vessels.

FIG. 3 shows an arrangement for supply of oxygen-enriched water to a number of breeding vessels and illustrates that the system is well suited for use in the form of a movable central unit which can be mounted on a movable frame or a so-called skid (not shown) and transported to the location where it is to be utilized.

Water with normal oxygen content is led under pressure into the oxygen enrichment 2 together with circulating oxygen gas which is provided by means of compressor 6. The tank 4 with liquid oxygen supplies gas to the compressor together with recirculated gas from the gas/liquid separator 3. To reduce the nitrogen content, bleed 10 is provided in close proximity to this gas stream. Water with a high content of oxygen and a low content of nitrogen is taken from the bottom of the liquid/gas separator 3 and added to a number of breeding vessels by means of a pump- and pipeline system 13, 14. Furthermore, a separate water supply 15 for water with normal oxygen content may be provided to thereby make it possible to control the oxygen content and temperature individually for the different vessels.

Figure 4:
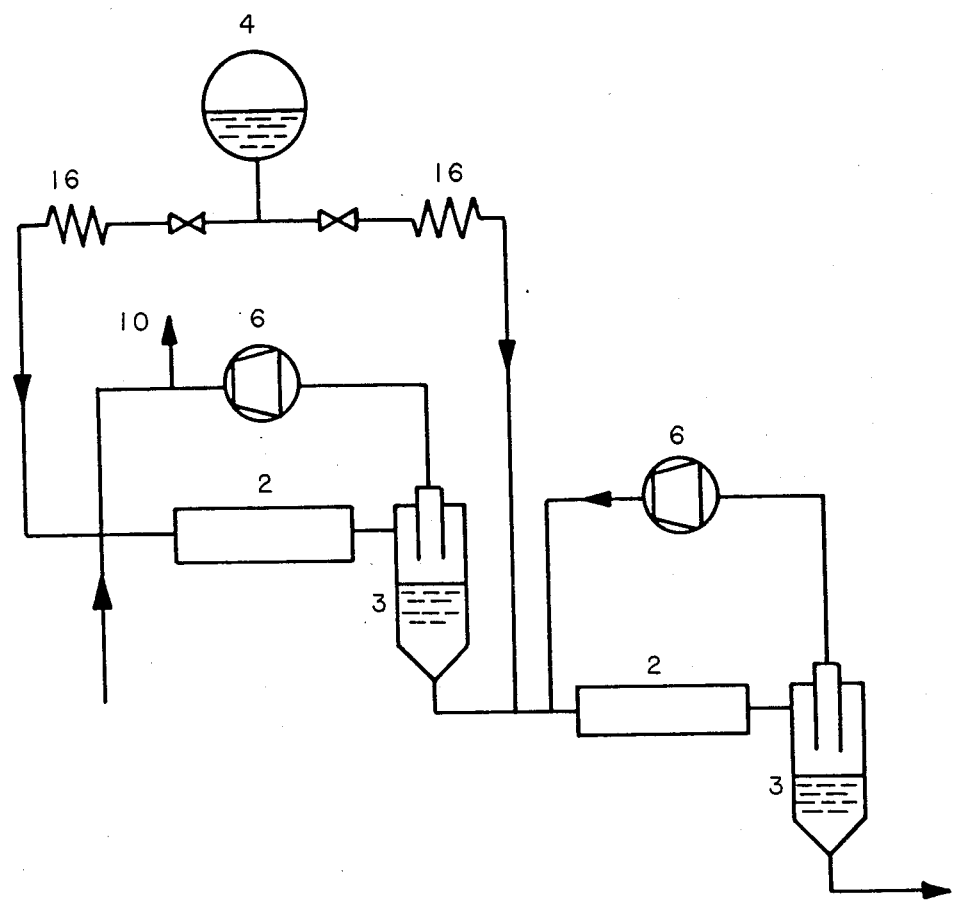
FIG. 4 is a schematic view of a preferred dual-stage system.

FIG. 4 shows a dual-stage system where the first stage is provided with a bleed 10 used to reduce the nitrogen control. The second stage is used for the final oxygen enrichment. The drawing of FIG. 4 is assumed to be self-explanatory. The different components of the system are given the same reference numbers as previously employed in connection with the systems according to FIGS. 1–3.

As the examples discussed below for a single-stage system and a dual-stage system show, with the dual-stage system having nitrogen reduction limited to the first stage, a substantially improved utilization of the available oxygen is obtained.

The total amount of gas circulated through the compressor 6 and the enrichment means 2 does not influence the final consumption of oxygen, but is important for creating a turbulent flow in the water/gas treatment zone and thus influences the efficiency of the enrichment means. In the calculations in the examples below the amounts of gas which are circulated are therefore not included.

| Calculations for Example No 1 - One-stage System |
|---|
| (a) Water in: 1000 m$^3$/h |
|     O$_2$-content: 7 ppm: 5 Nm$^3$/h |
|     N$_2$-content: 18 ppm: 15 Nm$^3$/h |
| (b) Water out: 1000 m$^3$/h |
|     O$_2$-content: 25 ppm: 18 Nm$^3$/h |
|     N$_2$-content: 10 ppm: 8 Nm$^3$/h |
| (c) Gas Composition in the Separator |
|     O$_2$: 69% (volume) |
|     N$_2$: 31% (volume) |
| (d) "Bleed": N$_2$ which is removed: 15−8 = 7 Nm$^3$/h |
|     Total "bleed": 7/0.31 = 22.6 Nm$^3$/h |
|     hereby O$_2$ (loss): 15.6 Nm$^3$/h |
| (e) Necessary O$_2$-supply from tank: |
|     18 + 15.6 − 5 = 28.6 Nm$^3$/h |
| (f) Conclusions |
|     1. O$_2$-enrichment of water: 18−5 = 13 Nm$^3$/h |
|        O$_2$-content in Water out: 25 ppm |
|        O$_2$-super saturation: 260% |
|     2. N$_2$-reduction in Water: 7 Nm$^3$/h |
|        N$_2$-saturation: 56% |
|     3. Utilization of added O$_2$ from tank: |
|     $\frac{28.6 - 15.6}{28.6} \cdot 100 = 45.4\%$ |

| -continued |
|---|
| Calculations for Example No 2 - Dual-stage System |
| (a) Water in: 1000 m$^3$/h |
|     O$_2$-content: 7 ppm: 5 Nm$^3$/h |
|     N$_2$-content: 18 ppm: 15 Nm$^3$/h |
| (b) First stage (N$_2$-reduction) |
|     O$_2$ added from tank: 8 Nm$^3$/h |
|     Gas Composition in enrichment means: |
|     O$_2$: 5 + 8 = 13 Nm$^3$/h = 46.4% (volume) |
|     N$_2$: 15 Nm$^3$/h = 53.6% (volume) |
|     "Bleed": N$_2$ which shall be removed: 7 Nm$^3$/h |
|     Total "bleed": 13 Nm$^3$/h |
|     hereby O$_2$ (loss): 6 Nm$^3$/h |
|     Necessary pressure in separator ca. 0.5 bar abs. |
| (c) Second-stage (O$_2$-enrichment) |
|     Water in: 1000 m$^3$/h |
|     O$_2$-content: 7 Nm$^3$/h |
|     N$_2$-content: 8 Nm$^3$/h |
|     O$_2$ added from tank: 18−7 = 11 Nm$^3$/h |
|     Water out: 1000 m$^3$/h |
|     O$_2$-content: 18 Nm$^3$/h |
|     N$_2$-content: 8 Nm$^3$/h |
| (d) Conclusions |
|     O$_2$-enrichment and N$_2$-reduction of water |
|     as in calculations for Example No. 1. |
|     Totally added O$_2$ from tank: |
|     8 + 11 = 19 Nm$^3$/h |
|     Utilized O$_2$ from tank: |
|     $\frac{19 - 6}{19} = 68.4\%$ |

Comment: The difference in efficiency between a dual-stage system and a single-stage system is clearly demonstrated. To obtain the stipulated values for oxygen and nitrogen in water, the systems require 28.6 and 19 Nm$^3$O$_2$/h respectively.

The practical, calculated examples which are described above, represent preferred embodiments of the utilization of the principle of the present invention. The centralized water treatment results in great flexibility. There are no upper limits for the ratio of oxygen/water due to the recirculation of the oxygen gas. Furthermore, the water flow can also be recirculated and be given repeated treatment with oxygen. Thereby it is possible to obtain really high super saturation values. A liquid with very high oxygen content is also very convenient to distribute into a greater volume of water. This is not so easy with a stream of gas forming bubbles in the breeding tank.

Thus, the utilization of the available breeding volume can be increased at the same time as the oxygen content can be maintained at a high level without a risk of enrichment of nitrogen and other gaseous contaminants.

An installation incorporating the water treatment unit is also very flexible and can be used for fresh water which is intended for addition to a pond or it can be used for water which is taken from a pond and returned to the same.

I claim:

1. A method of enriching water with oxygen to increase the oxygen content of the water to a super saturation of at least 120–250%, said method comprising:
simultaneously pumping water to be enriched with oxygen and an excess of oxygen into an oxygen enrichment mixing zone and therein mixing said water and oxygen to form a turbulent, foaming gas-liquid flow and thus enriching said water with a portion of said oxygen to a super saturation of at least 120–250%;
pumping said gas-liquid flow from said mixing zone into a gas-liquid separator zone and therein separating said oxygen enriched water from a gas mixture including an excess portion of said oxygen not enriched into said water and gaseous contaminants released from said water;

releasing at least a portion of said gaseous contaminants from said gas mixture, and recirculating the remaining gas mixture back to said mixing zone for mixture with additional water to be enriched with oxygen; and discharging said oxygen enriched water from said separator zone to a position of utilization.

2. A method as claimed in claim 1, further comprising elevating the pressure of said gas mixture and thereby increasing the level of super saturation of oxygen into said water.

3. A method as claimed in claim 1, wherein said discharging comprises forwarding said oxygen enriched water to a fish breeding vessel or pond.

4. A method as claimed in claim 1, wherein said releasing comprises bleeding off a portion of said gas mixture prior to recirculation thereof back to said mixing zone.

5. A method as claimed in claim 1, wherein said releasing comprises passing said gas mixture into means for separating at least a portion of said gaseous contaminants from said remaining gas mixture.

6. A method as claimed in claim 1, wherein said discharging comprises distributing said oxygen enriched water to a plurality of fish breeding vessels or ponds.

7. A method of enriching water with oxygen to increase the oxygen content of the water to a super saturation of at least 120–250%, said method comprising:

conducting a first stage comprising:

simultaneously pumping water to be enriched with oxygen and an excess of oxygen into a first oxygen enrichment mixing zone and therein mixing said water and oxygen to form a first turbulent, foaming gas-liquid flow and thus enriching said water with a portion of said oxygen;

pumping said first gas-liquid flow from said first mixing zone into a first gas-liquid separator zone and therein separating said oxygen enriched water from a first gas mixture including an excess portion of said oxygen not enriched into said water and gaseous contaminants released from said water;

releasing at least a portion of said gaseous contaminants from said first gas mixture, and recirculating the remaining gas mixture back to said first mixing zone for mixture with additional water to be enriched with oxygen;

discharging said oxygen enriched water from said first separator zone;

maintaining said first mixing zone and said first separator zone at a pressure of 0.5 to 1.0 bar abs. and thus removing nitrogen from said water to be enriched with oxygen; and conducting a second stage comprising:

simultaneously pumping oxygen enriched water from said first separator zone and an excess of oxygen into a second oxygen enrichment mixing zone and therein mixing said water and oxygen to form a second turbulent, foaming gas-liquid flow and thus enriching said water with a portion of said oxygen to a super saturation of at least 120–250%;

pumping said second gas-liquid flow from said second mixing zone into a second gas-liquid separator zone and therein separating said oxygen enriched water from a second gas mixture including an excess portion of said oxygen not enriched into said water and gaseous contaminants released from said water;

recirculating said second gas mixture back to said second mixing zone for mixture with additional oxygen enriched water from said first separator zone;

discharging said oxygen enriched water from said second separator zone to a position of utilization; and maintaining said second mixing zone and said second separator zone at a pressure above 1.0 bar abs. such that nitrogen is not removed during said second stage.

8. An apparatus for enriching water with oxygen to increase the oxygen content of the water to a super saturation of at least 120–250%, said apparatus comprising:

an oxygen enrichment mixing means;

means for simultaneously pumping water to be enriched with oxygen and an excess of oxygen into said mixing means and therein mixing said water and oxygen to form a turbulent, foaming gas-liquid flow and thus for enriching said water with a portion of said oxygen;

gas-liquid separator means for receiving said gas-liquid flow from said mixing means and for separating said oxygen enriched water from a gas mixture including an excess portion of said oxygen not enriched into said water and gaseous contaminants released from said water;

means for releasing at least a portion of said gaseous contaminants from said gas mixture;

means for recirculating the remaining gas mixture back to said mixing means for mixture with additional water to be enriched with oxygen; and means for discharging said oxygen enriched water from said separator means to a position of utilization.

9. An apparatus as claimed in claim 8, further comprising means for elevating the pressure of said gas mixture and thereby increasing the level of super saturation of oxygen into said water.

10. An apparatus as claimed in claim 8, wherein said releasing means comprises a bleed means for bleeding off a portion of said gas mixture prior to recirculation thereof back to said mixing means.

11. An apparatus as claimed in claim 8, wherein said discharging means comprises pump means and branched pipelines for forwarding said oxygen enriched water from said gas-liquid separator means to a plurality of fish breeding vessels or ponds.

12. An apparatus as claimed in claim 8, wherein said recirculating means comprises a return pipeline extending from said gas-liquid separator means to said mixing means and a compressor in said return pipeline for pressurizing said recirculated gas mixture.

13. An apparatus as claimed in claim 8, wherein said releasing means comprises means for separating at least a portion of said gaseous contaminants from said remaining gas mixture.

14. An apparatus as claimed in claim 13, wherein said separating means comprises a membrane separator.

* * * * *